United States Patent
Barker et al.

(10) Patent No.: US 7,811,379 B2
(45) Date of Patent: Oct. 12, 2010

(54) REGENERATED CALCIUM ALUMINATE PRODUCT AND PROCESS OF MANUFACTURE

(75) Inventors: Bruce James Barker, Hinsdale, IL (US); William Parker Breedlove, Cranberry Township, PA (US); Gene Anthony Iannazzo, Mechanicsburg, PA (US)

(73) Assignee: Harsco Corporation, Camp Hill, PA (US)

( * ) Notice: Subject to any disclaimer, the term of this patent is extended or adjusted under 35 U.S.C. 154(b) by 0 days.

(21) Appl. No.: 12/760,206

(22) Filed: Apr. 14, 2010

(65) Prior Publication Data

US 2010/0193733 A1    Aug. 5, 2010

Related U.S. Application Data

(62) Division of application No. 11/383,619, filed on May 16, 2006, now Pat. No. 7,727,328.

(51) Int. Cl.
  *C04B 7/32* (2006.01)
(52) U.S. Cl. .................. 106/692; 106/694; 106/789; 75/751

(58) Field of Classification Search .................. 106/692, 106/694, 789; 75/751
See application file for complete search history.

(56) References Cited

U.S. PATENT DOCUMENTS

| 4,342,590 | A | 8/1982 | Luyckx |
| 5,024,822 | A | 6/1991 | Hittner et al. |
| 5,286,274 | A | 2/1994 | Lindkvist et al. |
| 5,397,379 | A | 3/1995 | Barker et al. |
| 5,407,459 | A | 4/1995 | Breault et al. |
| 5,516,357 | A | 5/1996 | Edlinger et al. |

FOREIGN PATENT DOCUMENTS

| BE | 848 077 A1 | 5/1996 |
| GB | 2 047 677 A | 12/1980 |
| JP | 2004-143034 | 5/2004 |

*Primary Examiner*—Paul Marcantoni
(74) *Attorney, Agent, or Firm*—McNees Wallace & Nurick, LLC

(57) ABSTRACT

The disclosed invention provides an improved method that utilizes a liquid ladle slag in combination with a crushed material, such as a refractory brick, and alumina ladle brick or an aluminum dross, to manufacture a calcium aluminate product that can be used in the steel refining process.

16 Claims, No Drawings

REGENERATED CALCIUM ALUMINATE PRODUCT AND PROCESS OF MANUFACTURE

BACKGROUND OF THE INVENTION

1. Field of the Invention

This application relates to solid calcium aluminate products for use in steel refining processes. More specifically, this invention relates to a calcium aluminate product that is manufactured from a liquid slag and a crushed material.

2. Background Information

Steel slags are a by-product of the steel refining process. In general, steel slags result from the process of separating impurities, such as sulfur, phosphorus and metal oxides from within the molten steel. A number of steel slags (e.g. furnace slags; ladle slags) are produced during the steel refining process. Basic Oxygen Furnace (BOF) and Electric Arc Furnace (EAF) slags are formed in a high temperature chemical process that incorporates the injection of high-pressure oxygen into a furnace that contains a mixture of molten metal, metal scrap, and a number of fluxes that typically include lime (CaO) and dolomitic lime (CaO.MgO). When in the furnace, the furnace slag is a liquid melt comprised of various sulfides and oxides that typically float on top of the molten steel because of the density differences between the molten steel and the molten liquid slag. After melting the scrap in the charge and bringing the carbon and temperature of the melt to the desired levels, the molten steel is tapped (poured) into a ladle while the furnace slag is retained in the furnace and subsequently tapped (poured) into a furnace slag pot.

While in the ladle, the molten steel can be subjected to additional refining processes (ladle refining processes). For instance, additional fluxes may be added to the molten steel in order to further remove impurities that remained within the molten steel after being tapped from the furnace. The slags that are formed during the ladle refining process are generally referred to as ladle slags. After the ladle refining process is complete, the refined molten steel is tapped (poured) into a continuous caster after which the ladle slags are poured into a ladle slag pot. Generally, the chemical composition, as well as the physical properties, of the ladle slag makes the ladle slag unsuitable for recycling into the steel refining process. Accordingly, most ladle slags are discarded and transported to landfills for disposal.

SUMMARY OF THE INVENTION

One embodiment of the disclosed invention provides a method that utilizes a ladle slag in combination with a crushed material to manufacture a pre-melted or pre-fused calcium aluminate product that can be used in the steel refining process.

In accordance with another aspect of the invention, a method for manufacturing a calcium aluminate product from a composition of a crushed material and a liquid slag that is releasing a latent heat is provided. The method includes: providing the liquid ladle slag that is releasing the latent heat; adding the crushed material to the liquid ladle slag; fusing and melting the crushed material with the liquid ladle slag by utilizing the latent heat; and solidifying the liquid ladle slag. The composition may include from about 50% to about 95% by weight liquid ladle slag and from about 5% to about 50% by weight solid additive (crushed material).

Another aspect of the invention provides a calcium aluminate product, having about 40% CaO, about 40% $Al_2O_3$, about 5% MgO, about 5% $SiO_2$, less than about 3% FeO, less than about 1% MnO, and less than about 0.5% S, manufactured from a composition of a crushed material and a liquid ladle slag releasing a latent heat by a method that includes: providing the liquid ladle slag that is releasing the latent heat; adding the crushed material to the liquid ladle slag; fusing and melting the crushed material with the liquid ladle slag by utilizing the latent heat; and solidifying the liquid ladle slag.

DESCRIPTION OF THE PREFERRED EMBODIMENTS

As employed herein, the phrase "a quantity" or variations thereof means one or more.

As employed herein, the term "crushed," or variations thereof, means that the object is reduced in size and will include, by way of example and not limitation, an object that has been reduced in size by pounding, grinding, mashing, squeezing, or application of an external force.

When referring to any numerical range of values, such ranges are understood to include each and every number and/or fraction between the stated range minimum and maximum.

As stated elsewhere herein, after the ladle refining process is complete the refined molten steel is tapped from the ladle into a continuous caster after which the ladle slag, which is a by-product of the ladle refining process, is poured into a slag pot. Typically, the ladle slag is discarded due to the ladle slag's high concentration of sulfur and detrimental oxides, such as FeO and MnO and silicates. If the ladle slag is not discarded, the ladle slags are recycled into the steel refining process. Recycling a ladle slag in its pure form, however, has a number of drawbacks. For instance, a ladle slag generates a large amount of dust due to the ladle slag's high concentration of lime (CaO), which can be as high as about 75% of the total weight of the slag. The dust produced from the ladle slag creates environmental issues not only on-site at the steel plant but also within any area in which the ladle slag is stored, transported or processed. In addition to the high concentrations of lime, a ladle slag also contains high concentrations of sulfur (S), iron oxide (FeO), manganese oxide (MnO), phosphorous pentoxide ($P_2O_5$), and silica ($SiO_2$) which limit the total amount of ladle slag material that can be recycled into the steel refining process.

This invention discloses using a liquid ladle slag to produce a calcium aluminate product that can be used in the steel refining process. Specifically, this invention discloses an improved method of making a calcium aluminate product in which crushed material, such as a refractory alumina and magnesia spinel brick, alumina ladle brick or other forms of alumina such as aluminum dross or de-metallized dross residue, is added to a liquid ladle slag that is releasing latent heat. The latent heat melts and fuses the brick to the liquid ladle slag thereby creating a calcium aluminate product that has the chemical composition and the physical properties suitable for recycling into the steel refining process. In addition, the liquid ladle slag, being of a high CaO content, acts to chemically dissolve the alumina addition into the liquid slag.

In accordance with one embodiment of the invention, a ladle containing refined molten steel and a liquid ladle slag that is releasing latent heat is provided. The liquid ladle slag comprises: up to about 15% iron oxide (FeO); up to about 10% manganese oxide (MnO); up to about 15% magnesium oxide (MgO); up to about 15% silica ($SiO_2$); up to about 1% sulfur (S); from about 35% to about 65% lime (CaO); from about 10% to about 35% alumina ($Al_2O_3$); and from about 0.01% to about 0.15% phosphorous pentoxide ($P_2O_5$). The latent heat that is being released by the liquid ladle slag is about 600 British thermal units (BTUs) per pound (lb.). Prior to tapping the liquid ladle slag from the ladle to the ladle slag pot, the temperature of the liquid ladle slag ranges from about 2,000° F. to about 3,000° F. Preferably, the temperature of the liquid ladle slag ranges from about 2,500° F. to about 3,000° F.

A quantity of crushed material, such as crushed alumina ladle brick comprising from about 50% to about 85% alumina ($Al_2O_3$); up to about 15% silica ($SiO_2$); up to about 15% manganese oxide (MgO); up to about 10% iron oxide (FeO); up to about 10% carbon (C); and up to about 3% titanium dioxide ($TiO_2$), having a maximum size of about 0.5 inch (in.) and a preferable maximum size of about 0.25 inch (in.) is added to the liquid ladle slag in the ladle prior to pouring the mixture into a ladle slag pot. It should be noted, however, that the crushed material can also be added to the ladle slag pot before or after the liquid ladle slag has been tapped into the ladle slag pot. The crushed material is dissolved, melted and fused into the liquid ladle slag by the latent heat that is being released by the liquid ladle slag. If the crushed material is added to the liquid ladle slag in the ladle prior to pouring, the turbulence that is created from the pouring stream can actually promote the melting and fusion of the crushed material into the liquid ladle slag. Additionally, the melting and fusion of the crushed material with the liquid ladle slag can be facilitated by the addition of a number of fluxes, such as, but not limited to, $Na_2O$, $CaF_2$, MgO, CaO, $TiO_2$, $SiO_2$, to the liquid ladle slag. Such fluxes lower the melting point of the resulting combination of the liquid ladle slag and the alumina ladle brick addition.

The addition of the crushed material to the liquid ladle slag not only dilutes the S, FeO, MnO, $P_2O_5$, and $SiO_2$ contents of the liquid ladle slag, but it also ideally creates a calcium aluminate product having a $CaO:Al_2O_3$ ratio of about 1:1 when the liquid ladle slag solidifies. Furthermore, the reduction reaction between the carbon (C) in the crushed material and the FeO and MnO in the liquid ladle slag generates metallic iron (Fe) and manganese (Mn) that can be removed (recovered) during subsequent processing of the ladle slag. The recovered metallic iron and manganese can then be recycled into the steel refining process thereby improving the total metallic recovery yield of a steel mill.

Generally, in order obtain a calcium aluminate product comprising about 40% CaO, about 40% $Al_2O_3$, about 5% MgO, about 5% $SiO_2$, less than about 2% FeO, less than about 1% MnO, and less than about 0.5% S, which is a chemical composition that is suitable for recycling into the steel refining process, a blend (composition) of about 15% to about 30% by weight crushed alumina ladle brick is added to about 70% to about 85% by weight liquid ladle slag.

In accordance with one embodiment of the invention, the crushed material is crushed aluminum dross. The aluminum dross can have a chemical composition that comprises: from about 24% to about 28% alumina ($Al_2O_3$); from about 32% to about 38% aluminum hydroxide ($Al(OH)_3$); from about 14% to about 21% magnesium spinel ($MgAl_2O_4$); from about 1% to about 2% passivated aluminum ($Al.Al_2O_3$); up to about 1% silicon (Si); from about 1% to about 3% silica ($SiO_2$); up to about 10% lime (CaO); up to about 1% sodium aluminate ($Na_2Al_2O_4$); from about 2% to about 6% sodium fluoride (NaF); from about 5% to about 9% calcium fluoride ($CaF_2$); from about 1% to about 4% cryolite ($Na_3AlF_6$); up to about 1.2% sodium chloride (NaCl); and up to about 1% potassium chloride (KCl).

In accordance with another embodiment of the invention, the crushed material is a brick that comprises: from about 50% to about 86% MgO; up to about 10% C; and up to about 15% silica can be added to the liquid ladle slag, in place of the crushed alumina ladle bricks and/or aluminum dross, in order to increase the level of MgO in the final calcium aluminate product thereby protecting the refractory bricks, which are comprised of about 85% MgO, that are located in the slag line of the ladle where the steel to be refined is contained. The refractory bricks are protected because the addition of crushed brick having MgO provides an additional source of MgO that the liquid ladle slag would otherwise absorb from the refractory bricks that line the slag line since ladle slags absorb or chemically dissolve certain species of oxides until they are saturated with the oxide or other chemical species that they are deficient in.

In accordance with another embodiment of the invention, a liquid slag comprising: from about 35% to about 65% CaO; from about 10% to about 35% $Al_2O_3$; from about 1% to about 10% $SiO_2$; from about 3% to about 15% MgO; from about 0.1% to about 10% FeO; from about 0.1% to about 5% MnO; from about 0.01% to about 0.15% $P_2O_5$; and from about 0.01% to about 0.5% S can be provided in the ladle.

In accordance with yet another embodiment of the invention, the liquid slag comprises: up to about 15% FeO; up to about 10% MnO; from about 3% to about 15% MgO; from about 3% to about 15% $SiO_2$; up to about 1% S; from about 35% to about 65% CaO; from about 10% to about 35% $Al_2O_3$; and from about 0.01% to about 0.15% $P_2O_5$.

In accordance with yet another embodiment of the invention, the alumina ladle brick comprises: from about 50% to about 85% $Al_2O_3$; up to about 15% $SiO_2$; up to about 15% MgO; up to about 10% FeO; up to about 10% C; and up to about 3% $TiO_2$ In accordance with yet another embodiment of the invention, about 1,000 pounds (lbs.) to 2,500 pounds (lbs.) crushed alumina ladle bricks having been reduced to a maximum size of about 0.5 in. is added to the amount of liquid ladle slag that is generated from processing one ladle full of steel weighing from about 125 Tons to about 300 Tons.

In accordance with yet another embodiment of the invention, the crushed material is collected carbon waste material. The carbon waste material can be collected from a cokemaking process or from a coal power generating plant and can include, but shall not be limited to, carbon waste reclaimed from coke or coal screening operations and reclaimed and recycled coal fines from waste coal ponds. Coke fines, such as high carbon dust or graphite fines, can also be obtained from other carbon utilizing processes. For instance, high carbon dust can be collected from blast furnace baghouse collections while graphite fines can be collected from machining processes where graphite material is shaped.

In accordance with yet another embodiment of the invention, the crushed material is crushed graphite electrode waste.

In accordance with yet another embodiment of the invention, additional heat may be added to the steel in the ladle through the injection of oxygen and/or metallic aluminum. This is typically accomplished through an RH—OB degasser. Additionally, heat may be added to the steel in the ladle through the use of an LMF (Ladle Metallurgy Furnace) in which the steel in the ladle is subjected to the application of an electric arc for the purpose of reheating the steel to the proper casting temperature. The arc, supplied through graphite electrodes that descend onto the surface of the liquid steel, helps to completely fluidize the ladle slag and thereby facilitate the chemical refining of the steel in the ladle. LMF heating of the steel and slag is beneficial to the process that is disclosed in this invention since LMF heating generates a hotter and more fluid slag which stays in liquid form for a longer period of time. Moreover, LMF heating also generates additional latent heat in the liquid ladle slag which assists in the assimilation of the solid additive (e.g. alumina ladle bricks) in the liquid ladle slag.

Example 1

A liquid ladle slag, prior to pouring from the ladle, having a weight ranging from about 6,000 lbs. to about 8,000 lbs. and a temperature ranging from about 2,700° F. to about 2,800° F. releases from about 750,000 BTUs to about 1,000,000 BTUs as the liquid ladle slag cools from 2,700° F. to about 2,000° F. To manufacture a calcium aluminate product having a CaO: $Al_2O_3$ ratio of about 1:1, about 1,000 lbs. to about 1,500 lbs. of crushed alumina ladle brick should be added to the liquid ladle slag. At this quantity, the crushed alumina ladle bricks will require about 390,000 BTUs to about 585,000 BTUs to melt and fuse with the liquid ladle slag prior to solidification of the liquid ladle slag. The resulting calcium aluminate product will have a chemical composition comprising about 40% CaO, about 40% $Al_2O_3$, about 5% MgO, about 5% $SiO_2$, less than about 2% FeO, less than about 1% MnO, and less than about 0.5% S.

Advantages

In contrast to the ladle slags that are used in other recycling processes, this invention allows for the recycling of ladle slags that have an expanded initial chemical composition range. The unique ability to recycle ladle slags having an expanded initial chemical composition range is attributed to the addition of crushed material to the ladle slag while it is still in liquid form. The addition of crushed material, such as refractory bricks, alumina ladle bricks or aluminum dross, to the liquid ladle slag dilutes or otherwise chemically reduces the S, FeO, MnO, $P_2O_5$, and $SiO_2$ contents of the liquid ladle slag to levels that are suitable for use in the steel refining process. Accordingly, a liquid ladle slag having an expanded initial chemical composition can be recycled into the steel refining process by employing the disclosed method.

Another advantage to the improved method is that the amount of $CO_2$ that is generated during the manufacturing process is lower than the $CO_2$ that is generated when a calcium aluminate product of a similar chemistry is manufactured using a traditional calcium aluminate manufacturing process such as a kiln heating process that uses limestone and alumina. For example, for every lb. of 50% CaO/50% Al2O3 calcium aluminate that is generated in the kiln method using limestone, about 0.39 lbs. of $CO_2$ are generated. In contrast, 0.031 lbs. of $CO_2$ are generated when the improved method that is disclosed in this invention is used to chemically reduce 10% FeO to 0% FeO in 1 lb. of ladle slag. This is more than about a tenfold decrease in $CO_2$ generation when compared to the traditional method of kiln manufacture.

Yet another advantage of the improved method is that the improved method decreases the total amount of energy and fuel required to make a calcium aluminate product since the calcium aluminate product does not need to be manufactured through a kiln heating processes which uses a large amount of natural gas and oil. Accordingly, more calcium aluminate product can be manufactured using the disclosed invention per unit of energy.

Yet another advantage of the improved method is that the improved method not only increases the metallic recovery of slag processing, but it also chemically beneficiates the ladle slag from the form it was in prior to the solid addition. Due to this beneficiation reaction, ladle slags comprising up to about 15% FeO can now be candidates for a recycling and re-use process where prior to the disclosed invention these ladle slags could not be recycled or re-used.

Yet another advantage of the improved method is that the improved method reduces the total amount of ladle slags that are discarded during the steel refining process.

Since calcium aluminate is produced only in a few locations, and then transported to remote steel mills, the disclosed method allows a steel mill to locally (within the steel mill) manufacture its own calcium aluminate thereby significantly decreasing or eliminating the time, equipment, and energy costs associated with the transportation of calcium aluminate to the steel mill.

Yet another advantage to the calcium aluminate product that is manufactured from the disclosed method is that the calcium aluminate product is less dusty than products that are manufactured from other ladle slag recycling processes. This is because CaO, which is typically the source of dust in a recycled ladle slag product, is chemically tied up in the calcium aluminate product that is disclosed in this invention due to the calcium aluminate product's unique 1:1 ratio of CaO: $Al_2O_3$.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A calcium aluminate product having about 40% CaO, about 40% $Al_2O_3$, about 5% MgO, about 5% $SiO_2$, less than about 3% FeO, less than about 1% MnO, and less than about 0.5% S, manufactured from a composition of a liquid ladle slag releasing a latent heat and a crushed material by a method comprising:
    a. providing said liquid ladle slag that is releasing said latent heat;
    b. adding said crushed material to said liquid ladle slag;
    c. fusing and melting said crushed material with said liquid ladle slag by utilizing said latent heat; and
    d. solidifying said liquid ladle slag.

2. The calcium aluminate product according to claim 1, wherein said composition comprises:
    from about 70% to about 85% by weight said liquid ladle slag and
    from about 15% to about 30% by weight said crushed brick.

3. The calcium aluminate product according to claim 1, wherein said liquid ladle slag comprises:
    up to about 15% FeO;
    up to about 10% MnO;
    up to about 15% MgO;
    up to about 15% $SiO_2$;
    up to about 1% S;
    from about 35% to about 65% CaO;
    from about 10% to about 35% $Al_2O_3$; and
    from about 0.01% to about 0.15% $P_2O_5$.

4. The calcium aluminate product according to claim 1, wherein said liquid ladle slag comprises:
    from about 35% to about 65% CaO;
    from about 10% to about 35% $Al_2O_3$;
    from about 1% to about 10% $SiO_2$;
    from about 3% to about 15% MgO;
    from about 0.1% to about 10% FeO;

from about 0.1% to about 5% MnO;
from about 0.01% to about 0.15% $P_2O_5$; and
from about 0.01% to about 0.5% S.

5. The calcium aluminate product according to claim 1, wherein said liquid ladle slag comprises:
up to about 15% FeO;
up to about 10% MnO;
from about 3% to about 15% MgO;
from about 3% to about 15% $SiO_2$;
up to about 1% S; from about 35% to about 65% CaO;
from about 10% to about 35% $Al_2O_3$; and
from about 0.01% to about 0.15% $P_2O_5$.

6. The calcium aluminate product according to claim 1, wherein said crushed material is a crushed alumina ladle brick.

7. The calcium aluminate product according to claim 6, wherein said crushed alumina ladle brick comprises:
from about 50% to about 85% $Al_2O_3$;
up to about 15% $SiO_2$;
up to about 15% MgO;
up to about 10% FeO;
up to about 10% C; and
up to about 3% $TiO_2$.

8. The calcium aluminate product according to claim 1, wherein said crushed material is a crushed brick that comprises:
from about 50% to about 86% MgO;
up to about 10% C; and
up to about 15% $SiO_2$.

9. The calcium aluminate product according to claim 8, wherein said crushed brick further comprises up to about 15% $Al_2O_3$.

10. The calcium aluminate product according to claim 1, wherein said crushed material is a crushed aluminum dross.

11. The calcium aluminate product according to claim 10, wherein said crushed aluminum dross comprises:
from about 24% to about 28% alumina,
from about 32% to about 38% $Al(OH)_3$,
from about 14% to about 21% $MgAl_2O_4$,
from about 1% to about 2% $Al_2O_3$,
up to about 1% Si,
from about 1% to about 3% $SiO_2$,
up to about 10% CaO,
up to about 1% $Na_2Al_2O_4$,
from about 2% to about 6% NaF,
from about 5% to about 9% $CaF_2$,
from about 1% to about 4% $Na_3AlF_6$,
up to about 1.2% NaCl, and
up to about 1% KCl.

12. The calcium aluminate product according to claim 1, wherein said crushed material has a maximum size of about 1.27 cm (0.5 in).

13. The calcium aluminate product according to claim 12, wherein said crushed material has a maximum size of about 0.64 cm (0.25 in).

14. The calcium aluminate product according to claim 1, wherein said liquid ladle slag is releasing a latent heat of about 600 BTUs/lb.

15. The calcium aluminate product according to claim 11, wherein said composition comprises:
from about 70% to about 85% by weight said liquid ladle slag and
from about 15% to about 30% by weight said crushed brick.

16. The calcium aluminate product according to claim 1, wherein said crushed material is a crushed carbon waste material.

* * * * *